United States Patent
Lee et al.

(10) Patent No.: US 10,265,682 B2
(45) Date of Patent: Apr. 23, 2019

(54) CATALYST FOR SYNTHESIS OF HYDROGEN PEROXIDE AND SYNTHESIS OF HYDROGEN PEROXIDE USING SAME

(71) Applicant: Korea Institute of Science and Technology, Seoul (KR)

(72) Inventors: Seung Yong Lee, Seoul (KR); Sang Soo Han, Seoul (KR); Hyo Bin Nam, Seoul (KR); Kwan Young Lee, Seoul (KR); So Hye Cho, Seoul (KR); Ho Seong Jang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/726,841

(22) Filed: Oct. 6, 2017

(65) Prior Publication Data
US 2018/0193821 A1    Jul. 12, 2018

(30) Foreign Application Priority Data

Jan. 11, 2017 (KR) ........................ 10-2017-0004341
Aug. 16, 2017 (KR) ........................ 10-2017-0103644

(51) Int. Cl.
| | |
|---|---|
| *B01J 23/00* | (2006.01) |
| *B01J 23/34* | (2006.01) |
| *B01J 37/00* | (2006.01) |
| *B01J 37/02* | (2006.01) |
| *B01J 37/04* | (2006.01) |
| *B01J 37/08* | (2006.01) |
| *B01J 23/46* | (2006.01) |
| *C01B 15/029* | (2006.01) |
| *B01J 23/50* | (2006.01) |
| *B01J 37/06* | (2006.01) |
| *B01J 37/16* | (2006.01) |

(Continued)

(52) U.S. Cl.
CPC ............ *B01J 23/464* (2013.01); *B01J 23/50* (2013.01); *B01J 35/0013* (2013.01); *B01J 37/06* (2013.01); *B01J 37/08* (2013.01); *B01J 37/16* (2013.01); *C01B 15/01* (2013.01); *C01B 15/029* (2013.01)

(58) Field of Classification Search
CPC .......... B01J 23/464; B01J 23/50; B01J 23/66
See application file for complete search history.

(56) References Cited

U.S. PATENT DOCUMENTS

| | | |
|---|---|---|
| 1,108,752 A | 8/1914 | Henkel et al. |
| 4,681,751 A | 7/1987 | Gosser |
| | (Continued) | |

FOREIGN PATENT DOCUMENTS

KR    1020180082891 A    7/2018

OTHER PUBLICATIONS

Anindita Roy et al., "Enhanced Catalytic Activity of Ag/Rh Bimetallic Nanomaterial: Evidence of an Ensemble Effect," The Journal of Physical Chemistry, Jan. 1, 2016, pp. 5457-5467, vol. 120, No. 10, American Chemical Society.

(Continued)

*Primary Examiner* — Cam N. Nguyen
(74) *Attorney, Agent, or Firm* — Cantor Colburn LLP

(57) ABSTRACT

Provided is a catalyst for synthesizing hydrogen peroxide as represented by the following Chemical Formula 1:

$$Rh_xAg_{(1-x)},\qquad \text{[Chemical Formula 1]}$$

where $0<x<1$.

3 Claims, 2 Drawing Sheets
(2 of 2 Drawing Sheet(s) Filed in Color)

(51) Int. Cl.
*B01J 35/00* (2006.01)
*C01B 15/01* (2006.01)

(56) References Cited

U.S. PATENT DOCUMENTS

| | | | |
|---|---|---|---|
| 4,772,458 | A | 9/1988 | Gosser et al. |
| 5,292,496 | A | 3/1994 | Nagashima et al. |
| 5,352,645 | A | 10/1994 | Schwartz |
| 6,168,775 | B1 | 1/2001 | Zhou et al. |
| 6,576,214 | B2 | 6/2003 | Zhou et al. |
| 7,011,807 | B2 | 3/2006 | Zhou et al. |
| 7,144,565 | B2 | 12/2006 | Rueter et al. |
| 9,114,384 | B2 * | 8/2015 | Shirakawa ......... B01D 53/9413 |
| 9,115,621 | B2 * | 8/2015 | Shirakawa ......... B01D 53/9413 |

OTHER PUBLICATIONS

Stephany Garcia et al., "Microwave Synthesis of Classically Immiscible Rhodium-Silver and Rhodium-Gold Alloy Nanoparticles: Highly Active Hydrogenation Catalysts," ACS Nano, Jan. 1, 2014, pp. 11512-11521, vol. 8, No. 11.

European Search Report for corresponding European Patent Application No. 17195201.3 dated May 28, 2018, citing the above references.

Korean Office Action for corresponding Korean Patent Application No. 10-2017-0103644 dated Dec. 14, 2018, citing the above reference(s).

* cited by examiner

CATALYST FOR SYNTHESIS OF HYDROGEN PEROXIDE AND SYNTHESIS OF HYDROGEN PEROXIDE USING SAME

CROSS-REFERENCE TO RELATED APPLICATION

This application claims priority to and the benefit of Korean Patent Application No. 10-2017-0004341, filed on Jan. 11, 2017, and Application No. 10-2017-0103644, filed on Aug. 16, 2017, the disclosure of which is incorporated herein by reference in its entirety.

BACKGROUND

1. Field of the Invention

The present invention relates to a catalyst for synthesizing hydrogen peroxide and a method for synthesizing hydrogen peroxide using the same. More particularly, the present invention relates to a catalyst for synthesizing hydrogen peroxide, the catalyst having an excellent catalytic activity while being capable of replacing a palladium (Pd)-based catalyst; and a method for synthesizing hydrogen peroxide using the same.

2. Discussion of Related Art

Hydrogen peroxide ($H_2O_2$) is a general-purpose chemical used in various fields such as polishing products, disinfectants, medical products, rocket propellants, eco-friendly oxidizers, etc., the demand of which is continuously increasing.

Since being proposed for the first time by Hankel and Weber through U.S. Pat. No. 1,108,752 in 1914, a method of synthesizing hydrogen peroxide directly from hydrogen and oxygen has been variously researched by a number of companies for the purpose of reaction simplification and cost reduction. Representative companies among them include DuPont, Evonik Industries, Headwaters Inc., and the Dow Chemical Company, which have developed catalysts and reaction systems mainly based on palladium (Pd).

As disclosed in U.S. Pat. Nos. 4,681,751, 4,772,458, 5,352,645, etc., DuPont developed a catalyst for the direct synthesis of hydrogen peroxide by depositing Pd—Pt metals on carbon, silica, alumina, an ion-exchange resin, etc., and studied the effects of halogen ions in a water-soluble solvent on the production of hydrogen peroxide, the effects of a phosphoric acid-based additive on hydrogen peroxide stability, etc.

Headwaters Inc. developed a technique for increasing selectivity for hydrogen peroxide production by controlling the particle size and adsorption coordination number of Pd-based active metal using various metals as enhancers for the active metal and a technique for improving selectivity for hydrogen peroxide production and enhancing productivity of hydrogen peroxide by adding a halide to a solvent being used, as disclosed in U.S. Pat. Nos. 6,168,775, 6,576,214, 7,144,565, 7,011,807, etc. Also, a method capable of improving selectivity for hydrogen peroxide production and obtaining a hydrogen peroxide yield of 81% by maintaining a stoichiometric hydrogen/oxygen ratio in a reactor through the stepwise adjustment of the amount of hydrogen fed into the reactor is disclosed in U.S. Pat. No. 7,105,143. However, such a high hydrogen/oxygen ratio is a reaction condition that is not preferred in an aspect of reaction stability.

In addition, U.S. Pat. No. 5,292,496 assigned to Mitsubishi Gas Chemical Company, Inc. discloses a technique involving using a catalyst having a cerium-containing composite metal oxide as a catalyst carrier to directly synthesize hydrogen peroxide at a high concentration in a reaction medium not containing a halogen ion. However, in this case, the productivity of hydrogen peroxide is very low, with no more than 0.5 wt % being produced, and thus improvement is still required.

SUMMARY OF THE INVENTION

The present invention is directed to providing a novel catalyst with high activity and high efficiency and a method for synthesizing hydrogen peroxide using the same in a direct hydrogen peroxide synthesis process.

According to one embodiment, the present invention provides a catalyst for synthesizing hydrogen peroxide, the catalyst represented by the following Chemical Formula 1:

$Rh_xAg_{(1-x)}$,  [Chemical Formula 1]

where $0<x<1$.

According to another embodiment, the catalyst represented by Chemical Formula 1 may be in the form of a solid solution alloy in which solid rhodium (Rh) and solid silver (Ag) are mixed together or a core-shell consisting of solid Rh and solid Ag.

According to still another embodiment, the ratio of the number of Rh atoms with respect to 100% of the total number of atoms in Chemical Formula 1 may be 2 to 50%.

According to yet another embodiment, the ratio of the number of Rh atoms with respect to 100% of the total number of atoms in Chemical Formula 1 may be 2 to 7%.

According to an additional embodiment, the present invention provides a catalyst represented by Chemical Formula 1 for synthesizing hydrogen peroxide, wherein the catalyst is in the form of a nanocomposite containing Rh and Ag that are mixed together without forming a solid solution alloy and are distributed as a mixture on the surface of the nanocomposite.

$Rh_xAg_{(1-x)}$,  [Chemical Formula 1]

where $0<x<1$.

According to an another additional embodiment, the ratio of the number of Rh atoms with respect to 100% of the total number of atoms in Chemical Formula 1 may be 2 to 35%.

The catalyst according to the present invention is advantageous in that it exhibits high catalytic activity and can maintain a high hydrogen peroxide yield when used for a reaction for synthesizing hydrogen peroxide directly from hydrogen and oxygen.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
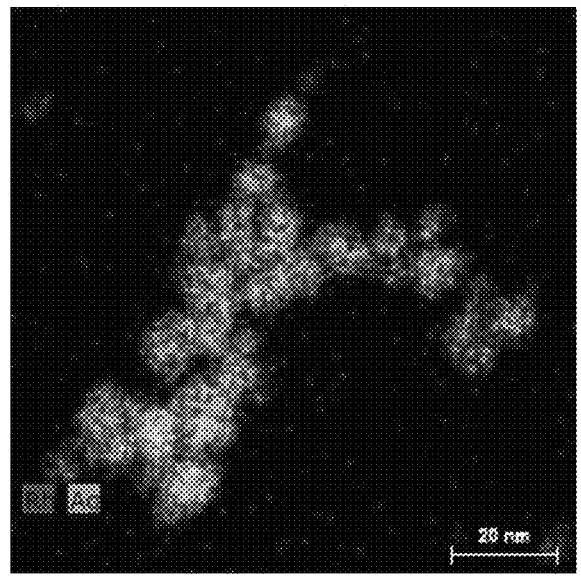
FIG. 1 is a scanning transmission electron microscopy-energy-dispersive X-ray spectroscopy (STEM-EDX) image of $Rh_{0.5}Ag_{0.5}$ according to one embodiment of the present invention.

Hereinafter, the present invention will be described in detail. The terms or words used in the present specification and claims should not be interpreted according to their ordinary or dictionary meaning, and, based on the principle that the inventor can appropriately define concepts of terms for describing his/her invention in the best way, should be interpreted to have the meaning and concept that are consistent with the technical spirit of the present invention. Since the embodiments described herein and the configurations illustrated in the drawings are among the most preferred embodiments of the present invention and do not represent the entire technical spirit of the present invention, it should be understood that the present invention covers various equivalents and modifications at the time of filing of this application.

A catalyst for synthesizing hydrogen peroxide according to one embodiment of the present invention is a compound represented by the following Chemical Formula 1:

$$Rh_xAg_{(1-x)},$$ [Chemical Formula 1]

where $0<x<1$.

In this case, the $Rh_xAg_{(1-x)}$, represented by Chemical Formula 1 may be in the form of a solid solution alloy in which solid rhodium (Rh) and solid silver (Ag) are mixed together or a core-shell consisting of solid Rh and solid Ag. This is because Rh and Ag, which are elements adjacent to palladium (Pd) in the periodic table and do not adsorb to hydrogen by themselves, attain the ability to adsorb to hydrogen when made into a solid solution alloy together due to the similarity between the solid solution alloy and Pd in terms of electron structure, chemical properties, and physical properties.

Therefore, the present invention can provide cost-effective catalysts for hydrogen peroxide comparable to a conventional Pd-based catalyst by using a mixture of Rh and Ag instead of on Pd.

FIG. 1 is a scanning transmission electron microscopy-energy-dispersive X-ray spectroscopy (STEM-EDX) image of $Rh_{0.5}Ag_{0.5}$ according to one embodiment of the present invention.

In FIG. 1, in which Ag appears as green particles and Rh appears as red particles, a solid solution state in which the two types of particles are dispersed can be identified.

Figure 2:
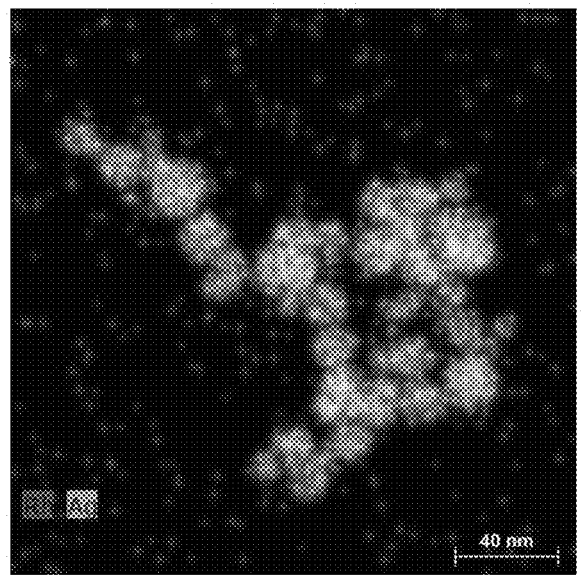
FIG. 2 is a STEM-EDX image of $Rh_{0.03}Ag_{0.97}$ according to another embodiment of the present invention.

In addition, as seen in FIG. 2, which is a STEM-EDX image of $Rh_{0.03}Ag_{0.97}$ according to another embodiment of the present invention, a solid solution state is identified also when the two types of particles are mixed in another mixing ratio.

In this case, the catalyst according to the present invention as represented by Chemical Formula 1 may contain Rh at 2 to 50% and preferably contains Rh at 2 to 7% in terms of the number of Rh atoms with respect to 100% of the total number of atoms in the chemical formula. When the Rh content is within this range, excellent hydrogen peroxide synthesis efficiency can be achieved.

A catalyst for synthesizing hydrogen peroxide according to another embodiment of the present invention is a material represented by the following Chemical Formula 1 and is in the form of a nanocomposite containing a mixture of Rh domain and Ag domain not in a solid solution state on the surface thereof. In this case, the nanocomposite refers to a structure having a surface on which surfaces of both Rh and Ag are exposed, forming an interface with each other.

$$Rh_xAg_{(1-x)},$$ [Chemical Formula 1]

where $0<x<1$.

In addition, the catalyst for synthesizing hydrogen peroxide may be formed as a result of Rh and Ag agglomerating together, in which case, both Rh and Ag may be exposed on the surface of the resulting cluster forming Rh—Ag interface. To synthesize hydrogen peroxide, the catalyst should function to effectively dissociate hydrogen molecules while preventing dissociation and promoting adsorption of oxygen molecules, and the expensive Pd-based catalyst is known to be most effective by successfully performing both roles. In the present invention, Rh capable of effectively dissociating hydrogen molecules and Ag capable of preventing dissociation and promoting adsorption of oxygen molecules are synthesized together into a nanocomposite that can function as a catalyst for synthesizing hydrogen peroxide. The synthesis of hydrogen peroxide takes place at an interface between Rh and Ag, and the performance thereof depends on the amount of interface, the rate at which the hydrogen molecules dissociate into hydrogen atoms, the rate at which the hydrogen atoms are transferred to the interface, the rate at which the adsorbed oxygen molecules are transferred to the interface, etc. Maximum performance may be achieved by adjusting the mixing ratio of Rh and Ag and the size of Rh and Ag domains.

The use of a catalyst based on a mixture of Rh and Ag instead of a Pd-based catalyst in the present invention leads to the performance of the direct synthesis of hydrogen peroxide that is comparable to that of a conventional Pd-based catalyst.

In this case, it is preferable that the catalyst according to the present invention as represented by Chemical Formula 1 contains Rh in the range of 2 to 35% in terms of the number Rh atoms with respect to 100% of the total number of atoms in the chemical formula for the reasons described above. Rh content exceeding 35% results in difficulty in supplying oxygen molecules and Rh content lower than 2% leads to difficulty in maintaining an adequate supply of hydrogen atoms, and in both cases the performance of the synthesis of hydrogen peroxide degrades. When the Rh content is within the aforementioned range, excellent efficiency of hydrogen peroxide synthesis can be achieved.

Hereinafter, the present invention will be described in greater detail with reference to exemplary embodiments. However, the following embodiments of the present invention may be modified into various other forms and should not be construed as limiting the scope of the present invention thereto. The embodiments of the present invention are provided so that this disclosure will be more thoroughly and completely explained to those of ordinary skill in the art.

Synthesis of Catalyst

Example 1—Production of $Rh_{50}Ag_{50}$ 1.526 g of poly(N-vinyl-2-pyrrolidone) (PVP; MW=55000) was dissolved in 200 mL of ethylene glycol, the solution was subjected to magnetic stirring at 500 rpm, and the temperature thereof was raised to 170° C. in an air atmosphere. 8.4 mg of 0.05 mmol $AgNO_3$ and 14.1 mg of 0.05 mmol rhodium acetate ($Rh(CH_3COO)_3$) were dissolved in 20 mL of DI water, the solution was added to the 170° C. PVP-ethylene glycol solution, and the mixture was allowed to react and be reduced to produce $Rh_{50}Ag_{50}$.

Example 2—Production of $Rh_{30}Ag_{70}$

A catalyst for synthesizing hydrogen peroxide was produced in the same manner as in Example 1 except that 0.763 g of PVP (MW=55000), 5.88 mg of $AgNO_3$ (0.035 mmol), 4.23 mg of $Rh(CH_3COO)_3$ (0.015 mmol), 100 mL of ethylene glycol, and 10 mL of DI water were used.

Example 3—Production of $Rh_{10}Ag_{90}$

A catalyst for synthesizing hydrogen peroxide was produced in the same manner as in Example 1 except that 0.763 g of PVP (MW=55000), 7.56 mg of $AgNO_3$ (0.045 mmol), 1.41 mg of $Rh(CH_3COO)_3$ (0.005 mmol), 100 mL of ethylene glycol, and 10 mL of DI water were used.

Example 4—Production of $Rh_7Ag_{93}$

A catalyst for synthesizing hydrogen peroxide was produced in the same manner as in Example 1 except that 0.763 g of PVP (MW=55000), 7.812 mg of $AgNO_3$ (0.0465 mmol), 0.987 mg of $Rh(CH_3COO)_3$ (0.0035 mmol), 100 mL of ethylene glycol, and 10 mL of DI water were used.

Example 5—Production of $Rh_5Ag_{95}$

A catalyst for synthesizing hydrogen peroxide was produced in the same manner as in Example 1 except that 0.763 g of PVP (MW=55000), 7.98 mg of $AgNO_3$ (0.0475 mmol), 0.705 mg of $Rh(CH_3COO)_3$ (0.0025 mmol), 100 mL of ethylene glycol, and 10 mL of DI water were used.

Example 6—Production of $Rh_4Ag_{96}$

A catalyst for synthesizing hydrogen peroxide was produced in the same manner as in Example 1 except that 0.763 g of PVP (MW=55000), 8.064 mg of $AgNO_3$ (0.048 mmol), 0.564 mg of $Rh(CH_3COO)_3$ (0.002 mmol), 100 mL of ethylene glycol, and 10 mL of DI water were used.

Example 7—Production of $Rh_3Ag_{97}$

A catalyst for synthesizing hydrogen peroxide was produced in the same manner as in Example 1 except that 0.763 g of PVP (MW=55000), 8.148 mg of $AgNO_3$ (0.0485 mmol), 0.423 mg of $Rh(CH_3COO)_3$ (0.0015 mmol), 100 mL of ethylene glycol, and 10 mL of DI water were used.

Example 8—Production of $Rh_2Ag_{98}$

A catalyst for synthesizing hydrogen peroxide was produced in the same manner as in Example 1 except that 0.763 g of PVP (MW=55000), 8.232 mg of $AgNO_3$ (0.049 mmol), 0.282 mg of $Rh(CH_3COO)_3$ (0.001 mmol), 100 mL of ethylene glycol, and 10 mL of DI water were used.

Comparative Example 1—Production of $Rh_{90}Ag_{10}$

A catalyst for synthesizing hydrogen peroxide was produced in the same manner as in Example 1 except that 0.763 g of PVP (MW=55000), 0.84 mg of $AgNO_3$ (0.005 mmol), 12.69 mg of $Rh(CH_3COO)_3$ (0.045 mmol), 100 mL of ethylene glycol, and 10 mL of DI water were used.

Comparative Example 2—Production of $Rh_{70}Ag_{30}$

A catalyst for synthesizing hydrogen peroxide was produced in the same manner as in Example 1 except that 0.763 g of PVP (MW=55000), 2.52 mg of $AgNO_3$ (0.015 mmol), 9.87 mg of $Rh(CH_3COO)_3$ (0.035 mmol), 100 mL of ethylene glycol, and 10 mL of DI water were used.

Comparative Example 3—Production of $Rh_1Ag_{99}$

A catalyst for synthesizing hydrogen peroxide was produced in the same manner as in Example 1 except that 0.763 g of PVP (MW=55000), 8.316 mg of $AgNO_3$ (0.0495 mmol), 0.141 mg of $Rh(CH_3COO)_3$ (0.0005 mmol), 100 mL of ethylene glycol, and 10 mL of DI water were used.

Synthesis of Hydrogen Peroxide

Example 9

Hydrogen peroxide was synthesized using 0.158 mg of the catalyst produced according to Example 1, 2 mL of a DI water-ethanol mixture (20%), 0.02 M $H_3PO_4$, and 0.9 mM NaBr at a total gas flow rate of 22 mL/min (volume ratio of oxygen to hydrogen=10:1).

Example 10

Hydrogen peroxide was synthesized in the same manner as in Example 9 except that the catalyst produced according to Example 2 was used.

Example 11

Hydrogen peroxide was synthesized in the same manner as in Example 9 except that the catalyst produced according to Example 3 was used.

Example 12

Hydrogen peroxide was synthesized in the same manner as in Example 9 except that the catalyst produced according to Example 4 was used.

Example 13

Hydrogen peroxide was synthesized in the same manner as in Example 9 except that the catalyst produced according to Example 5 was used.

Example 14

Hydrogen peroxide was synthesized in the same manner as in Example 9 except that the catalyst produced according to Example 6 was used.

Example 15

Hydrogen peroxide was synthesized in the same manner as in Example 9 except that the catalyst produced according to Example 7 was used.

Example 16

Hydrogen peroxide was synthesized in the same manner as in Example 9 except that the catalyst produced according to Example 8 was used.

Comparative Example 4

Hydrogen peroxide was synthesized in the same manner as in Example 9 except that Ag was used as a catalyst.

Comparative Example 5

Hydrogen peroxide was synthesized in the same manner as in Example 9 except that Rh was used as a catalyst.

Comparative Example 6

Hydrogen peroxide was synthesized in the same manner as in Example 9 except that a 1:1 physical mixture of Rh and Ag was used instead of a specially produced catalyst.

Comparative Example 7

Hydrogen peroxide was synthesized in the same manner as in Example 9 except that the catalyst produced according to Comparative Example 1 was used.

Comparative Example 8

Hydrogen peroxide was synthesized in the same manner as in Example 9 except that the catalyst produced according to Comparative Example 2 was used.

Comparative Example 9

Hydrogen peroxide was synthesized in the same manner as in Example 9 except that the catalyst produced according to Comparative Example 3 was used.

TABLE 1

| Embodiment | Catalyst | Hydrogen peroxide concentration (30 min) |
|---|---|---|
| Comparative Example 4 | Ag | 0.5 ppm |
| Comparative Example 5 | Rh | 0 |
| Comparative Example 6 | Rh + Ag | 0.5 ppm |
| Comparative Example 7 | Comparative Example 1 - $Rh_{90}Ag_{10}$ | 2 ppm |
| Comparative Example 8 | Comparative Example 2 - $Rh_{70}Ag_{30}$ | 2 ppm |
| Example 9 | Example 1 - $Rh_{50}Ag_{50}$ | 5 ppm |
| Example 10 | Example 2 - $Rh_{30}Ag_{70}$ | 5 ppm |
| Example 11 | Example 3 - $Rh_{10}Ag_{90}$ | 5 ppm |
| Example 12 | Example 4 - $Rh_{7}Ag_{93}$ | 5-10 ppm |
| Example 13 | Example 5 - $Rh_{5}Ag_{95}$ | 5-10 ppm |
| Example 14 | Example 6 - $Rh_{4}Ag_{96}$ | 5-10 ppm |
| Example 15 | Example 7 - $Rh_{3}Ag_{97}$ | 5-10 ppm |
| Example 16 | Example 8 - $Rh_{2}Ag_{98}$ | 5-10 ppm |
| Comparative Example 9 | Comparative Example 3 - $Rh_{1}Ag_{99}$ | 2 ppm |

Table 1 provided above shows the amount of hydrogen peroxide synthesized according to each of Examples 9 to 16 and Comparative Examples 4 to 8 during 30 minutes of reaction time.

Hydrogen peroxide is not synthesized at all when only Rh is used as a catalyst such as in the case of Comparative Example 5, and a very low yield of hydrogen peroxide results when only Ag is used as a catalyst such as in the case of Comparative Example 4.

In addition, when the Rh content in a catalyst is greater than 50% or less than 2% with respect to 100% of the total number of atoms in the catalyst such as in the case of Comparative Examples 7, 8, and 9, a much lower yield of hydrogen peroxide is obtained.

Furthermore, when a catalyst according to the present invention containing Ag, which is less expensive than Rh, at 50 to 98% with respect to 100% of the total number of atoms is used in addition to Rh, a significantly high yield of hydrogen peroxide is obtained compared to when only the expensive Rh is used as a catalyst. Therefore, the use of a catalyst according to the present invention for synthesizing hydrogen peroxide can reduce production cost, and commercial mass production can be expected accordingly.

Sodium Borohydride Synthesis Method for Synthesis of RhAg Catalysts with Varying Composition A solution prepared by dissolving 0.153 g of PVP (MW=55000) and 0.012 g of $NaBH_4$ in 15 mL of DI water in a round flask, followed by magnetically stirring at 1000 rpm in an ice bath; and each of solutions prepared by dissolving $AgNO_3$ and $Rh(CH_3COO)_3$ in 5 mL of DI water according to the compositions shown in the following Table 2 were mixed together to prepare RhAg catalysts with varying composition. The RhAg nanoparticles thus synthesized were subjected to centrifugation at 10000 rpm for 20 minutes using acetone (1.5 vol %) and then were washed with ethanol and hexane (10000 rpm, 20 minutes). The RhAg nanoparticles thus washed were dispersed in 5 mL of ethylene glycol, a temperature of the mixture was raised to 170° C., and the mixture was heat treated for one hour while stirring. In this case, a nanocomposite can be obtained even when the heat treatment process is omitted.

TABLE 2

| Embodiment | Product | PVP | $NaBH_4$ | $AgNO_3$ | $Rh(CH_3COO)_3$ |
|---|---|---|---|---|---|
| Comparative Example 10 | Rh | 0.153 g | 0.012 g | — | 2.820 mg (0.010 mmol) |
| Comparative Example 11 | $Rh_{93}Ag_{7}$ | | | 0.168 mg (0.001 mmol) | 2.538 mg (0.009 mmol) |
| Comparative Example 12 | $Rh_{88}Ag_{12}$ | | | 0.504 mg (0.003 mmol) | 1.974 mg (0.007 mmol) |
| Comparative Example 13 | $Rh_{57}Ag_{43}$ | | | 0.840 mg (0.005 mmol) | 1.410 mg (0.005 mmol) |
| Example 17 | $Rh_{35}Ag_{65}$ | | | 1.176 mg (0.007 mmol) | 0.846 mg (0.003 mmol) |

TABLE 2-continued

| Embodiment | Product | PVP | NaBH$_4$ | AgNO$_3$ | Rh(CH$_3$COO)$_3$ |
|---|---|---|---|---|---|
| Example 18 | Rh$_{12}$Ag$_{88}$ | | | 1.512 mg (0.0090 mmol) | 0.282 mg (0.001 mmol) |
| Example 19 | Rh$_7$Ag$_{93}$ | | | 1.562 mg (0.0093 mmol) | 0.197 mg (0.0007 mmol) |
| Example 20 | Rh$_4$Ag$_{96}$ | | | 1.613 mg (0.0096 mmol) | 0.113 mg (0.0004 mmol) |
| Example 21 | Rh$_3$Ag$_{97}$ | | | 1.630 mg (0.0097 mmol) | 0.085 mg (0.0003 mmol) |
| Example 22 | Rh$_2$Ag$_{98}$ | | | 1.638 mg (0.00975 mmol) | 0.070 mg (0.00025 mmol) |
| Comparative Example 14 | Rh$_1$Ag$_{99}$ | | | 1.646 mg (0.0098 mmol) | 0.056 mg (0.0002 mmol) |
| Comparative Example 15 | Ag | | | 1.680 mg (0.010 mmol) | — |

Synthesis of Hydrogen Peroxide

Hydrogen peroxide was synthesized using 0.158 mg of each of the Rh$_x$Ag$_{(1-x)}$, catalysts prepared according to examples and comparative examples described above, 2 mL of a DI water-ethanol mixture (20%), 0.02 M H$_3$PO$_4$, and 0.9 mM NaBr at a total gas flow rate of 70 mL/min (volume ratio of oxygen to hydrogen=10:1). Table 3 provided below shows the amount of hydrogen peroxide synthesized during 60 minutes of reaction time.

TABLE 3

| Catalyst | Hydrogen peroxide concentration (60 min) |
|---|---|
| Comparative Example 10 - Rh | 0.5 ppm |
| Comparative Example 15 - Ag | 0 |
| Rh + Ag | 0.5 ppm |
| Comparative Example 11 - Rh$_{93}$Ag$_7$ | 2 ppm |
| Comparative Example 12 - Rh$_{88}$Ag$_{12}$ | 2~5 ppm |
| Comparative Example 13 - Rh$_{57}$Ag$_{43}$ | 5~10 ppm |
| Example 17 - Rh$_{35}$Ag$_{65}$ | 10 ppm |
| Example 18 - Rh$_{12}$Ag$_{88}$ | 10 ppm |
| Example 19 - Rh$_7$Ag$_{93}$ | 5~10 ppm |
| Example 20 - Rh$_4$Ag$_{96}$ | 5~10 ppm |
| Example 21 - Rh$_3$Ag$_{97}$ | 2~5 ppm |
| Example 22 - Rh$_2$Ag$_{98}$ | 2~5 ppm |
| Comparative Example 14 - Rh$_1$Ag$_{99}$ | 0.5~2 ppm |

As seen in Table 3, hydrogen peroxide is not synthesized at all when only Ag is used as a catalyst such as in the case of Comparative Example 15, and the use of only Rh as a catalyst such as in the case of Comparative Example 10 results in a very low yield of hydrogen peroxide.

In addition, when a catalyst according to the present invention containing Ag, which is less expensive than Rh, at 65 to 98% with respect to 100% of the total number of atoms is used in addition to Rh, a significantly high yield of hydrogen peroxide is obtained compared to when only the expensive Rh is used as a catalyst. Therefore, the use of a catalyst according to the present invention for synthesizing hydrogen peroxide can reduce production cost, and commercial mass production can be expected accordingly.

Figure 3:
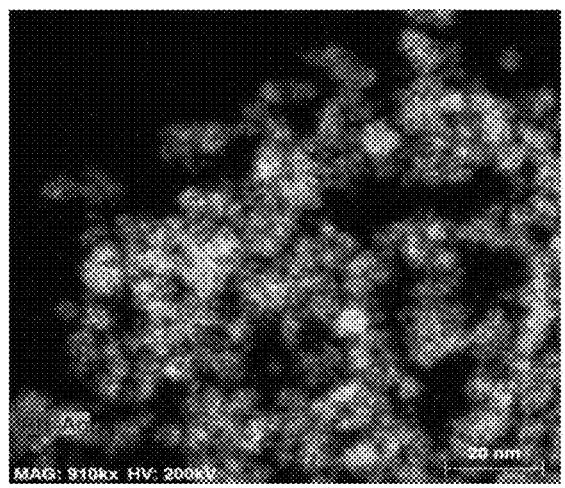
FIG. 3 is an electron microscopic image of a nanocomposite according to Example 17.

FIG. 3, which is an electron microscopic image of a nanocomposite according to Example 17, shows that Rh and Ag together make up a nanocomposite particle not in a solid solution state, thus having surfaces exposed on the surface of the particle and forming an interface with each another.

Figure 4:
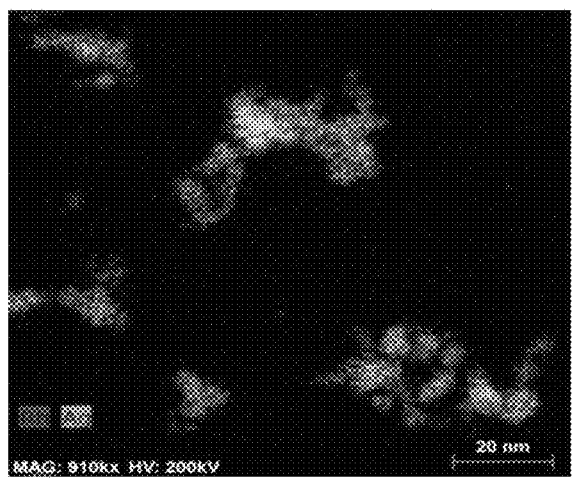
FIG. 4 is an electron microscopic image of a nanocomposite according to Example 17 before heat treatment.

Also, FIG. 4, which is an electron microscopic image of a nanocomposite according to Example 17 before heat treatment, shows that Rh and Ag form an interface with each other in the nanocomposite and do not form a solid solution alloy together, even before heat treatment.

While the present invention has been described with reference to particular exemplary embodiments and drawings, the embodiments and drawings do not limit the present invention thereto and may be variously changed and modified without departing from the technical spirit of the invention and the scope of the appended claims as to be understood by those skilled in the art.

What is claimed is:

1. A catalyst for synthesizing hydrogen peroxide, the catalyst represented by Chemical Formula 1 provided below:

Rh$_x$Ag$_{(1-x)}$, (Chemical Formula 1)

where 0<x<1,
wherein the catalyst contains solid rhodium (Rh) at 2 to 7% in terms of a ratio of the number of Rh atoms with respect to 100% of a total number of atoms in Chemical Formula 1.

2. The catalyst according to claim 1, wherein the catalyst is in a form of a solid solution alloy in which Rh and solid silver (Ag) are mixed together or a core-shell structure consisting of solid Rh and solid Ag.

3. A catalyst for synthesizing hydrogen peroxide, the catalyst represented by Chemical Formula 1 provided below and in a form of a composite containing Rh and Ag, wherein the Rh and the Ag are mixed together without forming a solid solution alloy and form an interface with each other:

Rh$_x$Ag$_{(1-x)}$, (Chemical Formula 1)

where 0<x<1,
wherein the catalyst contains Rh at 2 to 35% in terms of a ratio of the number of Rh atoms with respect to 100% of a total number of atoms in Chemical Formula 1.

* * * * *